US012598120B2

(12) United States Patent
Wang et al.

(10) Patent No.: US 12,598,120 B2
(45) Date of Patent: Apr. 7, 2026

(54) METHOD FOR IMPROVING CONNECTION POOL EFFICIENCY TO IMPROVE OBJECT STORAGE ACCESS PERFORMANCE

(71) Applicant: DELL PRODUCTS L.P., Round Rock, TX (US)

(72) Inventors: Cheng Wang, Beijing (CN); Fei Wang, Sunnyvale, CA (US); Yinan Qi, Beijing (CN)

(73) Assignee: DELL PRODUCTS L.P., Round Rock, TX (US)

( * ) Notice: Subject to any disclaimer, the term of this patent is extended or adjusted under 35 U.S.C. 154(b) by 47 days.

(21) Appl. No.: 18/645,740

(22) Filed: Apr. 25, 2024

(65) Prior Publication Data

US 2025/0337664 A1     Oct. 30, 2025

(51) Int. Cl.
*H04L 43/04* (2022.01)
*H04L 61/58* (2022.01)
*H04L 67/1017* (2022.01)
*H04L 67/1097* (2022.01)

(52) U.S. Cl.
CPC .............. *H04L 43/04* (2013.01); *H04L 61/58* (2022.05); *H04L 67/1017* (2013.01); *H04L 67/1097* (2013.01)

(58) Field of Classification Search
CPC . H04L 61/58; H04L 67/1017; H04L 67/1097; H04L 61/4511; H04L 67/568; H04L 63/0281
See application file for complete search history.

(56) References Cited

U.S. PATENT DOCUMENTS

| | | | | |
|---|---|---|---|---|
| 8,024,441 | B2 * | 9/2011 | Kommula | ........... H04L 67/1008 709/224 |
| 8,341,297 | B2 * | 12/2012 | Swildens | ............ H04L 67/1027 709/219 |
| 8,971,323 | B2 * | 3/2015 | Mithyantha | ............. H04L 45/18 370/395.31 |
| 2015/0058488 | A1 * | 2/2015 | Backholm | ............... H04L 61/58 709/226 |
| 2021/0133183 | A1 * | 5/2021 | Biswas | ................. H04L 67/101 |
| 2021/0200778 | A1 * | 7/2021 | Robison | .............. H04L 43/0894 |
| 2025/0150409 | A1 * | 5/2025 | Jiang | ....................... H04L 67/10 |

* cited by examiner

*Primary Examiner* — Chirag R Patel
(74) *Attorney, Agent, or Firm* — WOMBLE BOND DICKINSON (US) LLP

(57) ABSTRACT

Embodiments of the present disclosure provide a method, an electronic device, and a computer program product for connection pool efficiency. The method may include determining a set of connections in a connection pool of a storage system, the set of connections corresponding to open connections established by the storage system to a set of end-points of an object storage service of a cloud provider, wherein an application of the storage system accesses the object storage service through one or more connections from the set of connections; monitoring data transfers over the set of connections; collecting performance metrics associated with the data transfers; identifying a first connection having performance metrics below a predetermined threshold; identifying a second connection being added to the set of connections in the connection pool, wherein the second connection is a new connection; and marking the first connection for removal from the connection pool.

20 Claims, 7 Drawing Sheets

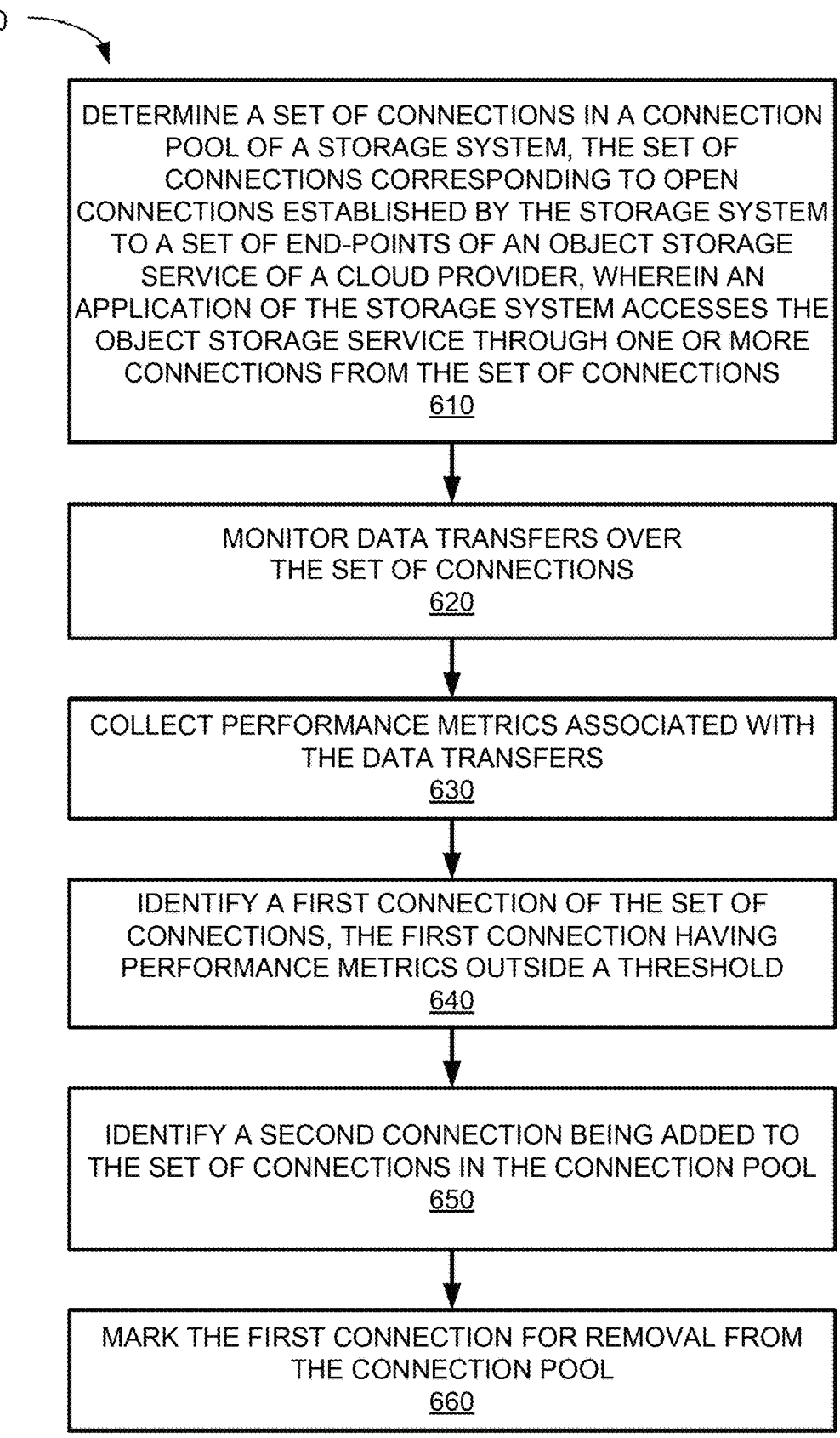

DETERMINE A SET OF CONNECTIONS IN A CONNECTION POOL OF A STORAGE SYSTEM, THE SET OF CONNECTIONS CORRESPONDING TO OPEN CONNECTIONS ESTABLISHED BY THE STORAGE SYSTEM TO A SET OF END-POINTS OF AN OBJECT STORAGE SERVICE OF A CLOUD PROVIDER, WHEREIN AN APPLICATION OF THE STORAGE SYSTEM ACCESSES THE OBJECT STORAGE SERVICE THROUGH ONE OR MORE CONNECTIONS FROM THE SET OF CONNECTIONS
610

MONITOR DATA TRANSFERS OVER THE SET OF CONNECTIONS
620

COLLECT PERFORMANCE METRICS ASSOCIATED WITH THE DATA TRANSFERS
630

IDENTIFY A FIRST CONNECTION OF THE SET OF CONNECTIONS, THE FIRST CONNECTION HAVING PERFORMANCE METRICS OUTSIDE A THRESHOLD
640

IDENTIFY A SECOND CONNECTION BEING ADDED TO THE SET OF CONNECTIONS IN THE CONNECTION POOL
650

MARK THE FIRST CONNECTION FOR REMOVAL FROM THE CONNECTION POOL
660

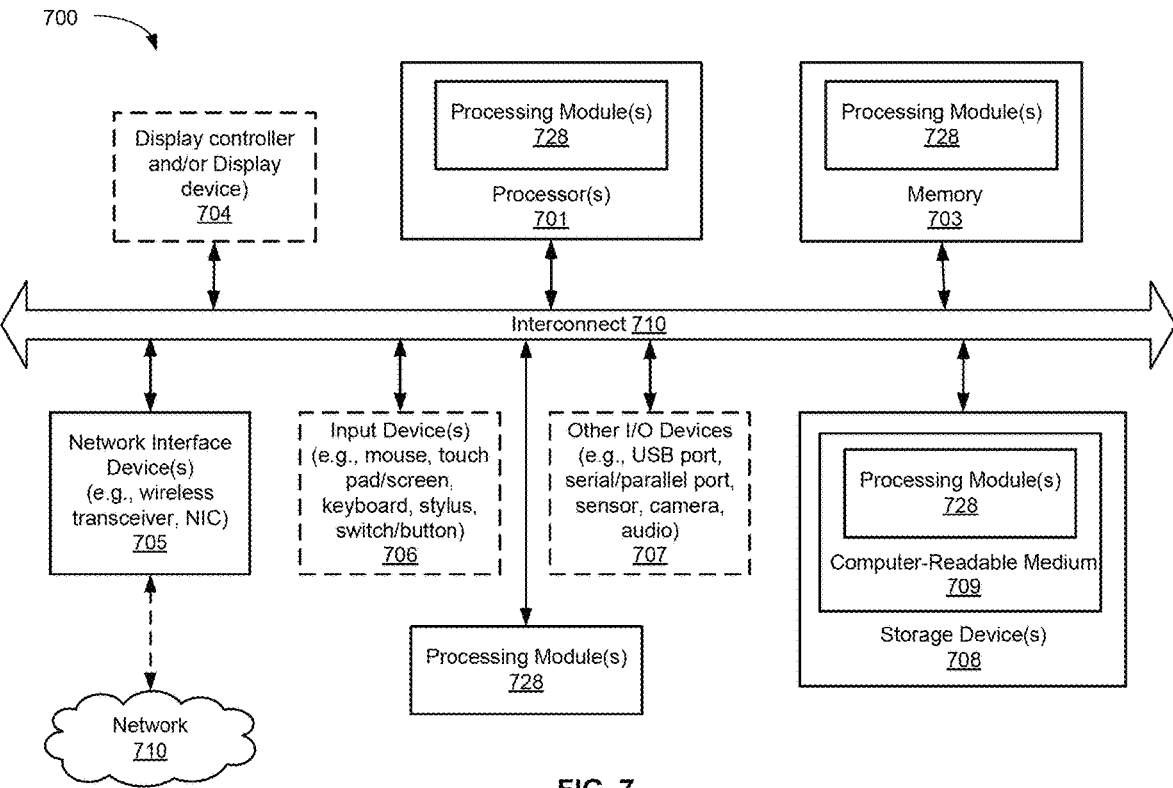

Display controller and/or Display device)
704

Processing Module(s)
728

Processor(s)
701

Processing Module(s)
728

Memory
703

Interconnect 710

Network Interface Device(s)
(e.g., wireless transceiver, NIC)
705

Input Device(s)
(e.g., mouse, touch pad/screen, keyboard, stylus, switch/button)
706

Other I/O Devices
(e.g., USB port, serial/parallel port, sensor, camera, audio)
707

Processing Module(s)
728

Computer-Readable Medium
709

Storage Device(s)
708

Processing Module(s)
728

Network
710

FIG. 7

METHOD FOR IMPROVING CONNECTION POOL EFFICIENCY TO IMPROVE OBJECT STORAGE ACCESS PERFORMANCE

TECHNICAL FIELD

Embodiments of the present disclosure relate to the field of computers, and more specifically, to a method of improving connection pool efficiency so as to improve the performance of object storage access.

BACKGROUND

Many modern storage systems leverage object storage to take advantage of performance, cost, scalability, availability, and durability. A connection pool can help improve the performance of object storage access from the perspective of resource efficiency, performance, scalability, and load balancing. However, in many distributed object storage software stacks, the cloud layer is treated as a static expressway. In the event of slow connections or slow handling at the object storage end-points, a connection pool cannot quickly and dynamically adjust to accommodate them. Additionally, low performance connections continue to process data transfers until the end of their lifecycle. A mechanism is needed to prune slow connections from the connection pool.

SUMMARY OF THE INVENTION

Embodiments of the present disclosure provide a solution for improving connection pool efficiency.

In a first aspect of the present disclosure, a method for improving connection pool efficiency is provided. The method may include determining a set of connections in a connection pool of a storage system, the set of connections corresponding to open connections established by the storage system to a set of end-points of an object storage service of a cloud provider, in which an application of the storage system accesses the object storage service through one or more connections from the set of connections. The method may further include monitoring data transfers over the set of connections including transmitting and receiving of data from the storage system to the object storage service. The method may further include collecting performance metrics associated with the data transfers. The method may further include identifying a first connection of the set of connections, the first connection having performance metrics below a predetermined threshold. The method may further include identifying a second connection being added to the set of connections in the connection pool. In addition, the method may include marking the first connection for removal from the connection pool.

In a second aspect of the present disclosure, an electronic device is provided, which includes a processor; and a memory coupled to the processor and having instructions stored therein, wherein the instructions, when executed by the processor, cause the electronic device to perform actions including: determining a set of connections in a connection pool of a storage system, the set of connections corresponding to open connections established by the storage system to a set of end-points of an object storage service of a cloud provider, wherein an application of the storage system accesses the object storage service through one or more connections from the set of connections; monitoring data transfers over the set of connections including transmitting and receiving of data from the storage system to the object storage service; collect performance metrics associated with the data transfers; identifying a first connection of the set of connections, the first connection having performance metrics below a predetermined threshold; identifying a second connection being added to the set of connections in the connection pool; and marking the first connection for removal from the connection pool.

In a third aspect of the present disclosure, a computer program product is provided. The computer program product is tangibly stored on a computer-readable medium and includes machine-executable instructions, and the machine-executable instructions, when executed, cause a machine to execute any step of the method according to the first aspect.

The Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

Example embodiments of the present disclosure are described in more detail with reference to the accompanying drawings, the above and other objectives, features, and advantages of the present disclosure will become more apparent, and identical or similar reference numbers generally represent identical or similar components in the example embodiments of the present disclosure. In the drawings:

FIG. 6 is a flow diagram of a process for improving connection pool efficiency and improving object storage access performance according to an embodiment of the present disclosure; and FIG. 7 is a block diagram of an example system that may be configured to implement embodiments of the present disclosure.

DETAILED DESCRIPTION

Figure 1:
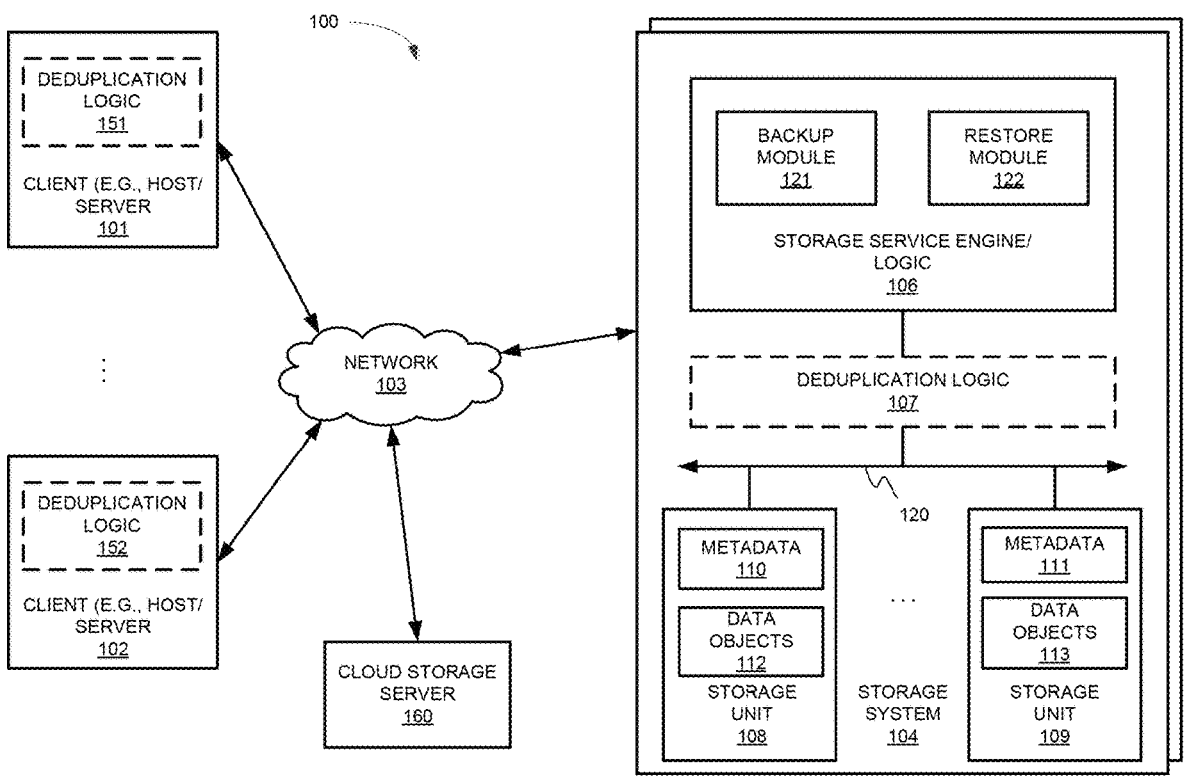
FIG. 1 is a schematic diagram of an example environment according to an embodiment of the present disclosure.

The principles of the present disclosure will be described below with reference to several example embodiments illustrated in the accompanying drawings.

As used herein, the term "includes" and variations thereof mean open-ended inclusion, that is, "including but not limited to." Unless specifically stated, the term "or" means "and/or." The term "based on" means "based at least in part on." The terms "an example embodiment" and "an embodiment" indicate "a group of example embodiments." The term "another embodiment" indicates "a group of other embodiments." The terms "first," "second," and the like may refer to different or identical objects. Other explicit and implicit definitions may also be included below.

Storage and management of data has emerged as a critical aspect for businesses and individuals alike. Amidst this technological revolution, cloud object storage stands out as a pivotal solution, revolutionizing how data is stored, accessed, and managed. Cloud object storage, often referred to as object-based storage, is a method of storing data as discrete units, known as objects, within a distributed architecture. Unlike traditional file-based storage systems, where data is organized in a hierarchical structure, cloud object storage treats data as immutable objects with unique identifiers. These objects consist of data, metadata, and a unique identifier, enabling seamless scalability and efficient data retrieval.

At the heart of cloud object storage lies a distributed architecture comprising multiple storage nodes interconnected through a network. These storage nodes collectively form a storage cluster, providing redundancy, fault tolerance, and scalability. Key components of cloud object storage can include: object storage devices, metadata servers, and access interfaces. Object storage devices (OSDs) are the underlying hardware components responsible for storing and retrieving objects. OSDs can be commodity hardware equipped with storage drives and network interfaces. Metadata servers manage the metadata associated with each object stored in the system. They maintain indexes and mappings to facilitate efficient object retrieval and management. Cloud object storage systems offer various access interfaces, including RESTful APIs, SDKs, and command-line interfaces, enabling seamless integration with applications and workflows.

Cloud object storage can offer a plethora of benefits. First, cloud object storage systems are inherently scalable, allowing organizations to seamlessly accommodate growing volumes of data without significant infrastructure overhauls. Cloud object storage systems can be very cost efficient. By leveraging a pay-as-you-go model, cloud object storage can eliminate the need for upfront capital investment in infrastructure, resulting in cost savings and predictable operational expenses. With built-in redundancy and data replication mechanisms, cloud object storage can ensure high durability and reliability, minimizing the risk of data loss or corruption. Cloud object storage can enable access to data from anywhere with an internet connection, facilitating collaboration and data sharing across geographically dispersed teams. The abstraction of storage resources into discrete objects can simplify data management tasks such as backup, archival, and data lifecycle management.

However, accessing data from cloud object storage may introduce latency compared to on-premises storage solutions, especially for latency-sensitive applications. Cloud storage connection pools can be a critical component in achieving efficiency, scalability, and performance in cloud-based data management. Cloud storage connection pools serve as a middleware layer that manages and maintains a pool of pre-established connections between applications and cloud storage services. These connections are established and reused as needed, eliminating the overhead of establishing new connections for each data access request. By leveraging connection pooling, applications can optimize resource utilization, minimize latency, and enhance scalability in cloud storage environments. Cloud storage connection pools consist of several key components and functionalities tailored to streamline the interaction between applications and cloud storage services. These components and functionalities include: 1) a connection pool manager; 2) connection pool configuration; 3) connection reuse and recycling; 4) connection health monitoring; and 5) load balancing and connection routing.

The connection pool manager is responsible for creating, managing, and monitoring the pool of connections between the application and the cloud storage service. It handles connection lifecycle management tasks, such as connection creation, validation, recycling, and eviction, to ensure optimal performance and resource utilization.

Connection pools offer configurable parameters to fine-tune their behavior and performance based on specific application requirements. Developers can adjust parameters such as pool size, connection timeout, idle connection eviction policies, and connection validation strategies to optimize performance and reliability.

Cloud storage connection pools facilitate connection reuse by maintaining a pool of idle connections that can be reused for subsequent data access requests. Instead of establishing new connections for each request, the pool recycles existing connections, reducing connection establishment overhead and latency.

Connection pools continuously monitor the health and availability of connections to detect and handle failures or connectivity issues proactively. Health monitoring mechanisms, such as connection validation checks and timeout configurations, ensure that only healthy and functional connections are used for data access operations.

In distributed cloud storage environments, connection pools may incorporate load balancing and connection routing capabilities to distribute data access requests across multiple storage nodes or regions. Load balancing algorithms optimize resource utilization and mitigate hotspots, ensuring balanced workload distribution and improved performance.

By minimizing connection overhead and latency, connection pools can enhance the performance of data access operations, resulting in faster response times and improved application responsiveness. They can optimize resource utilization by reusing existing connections and maintaining a pool of idle connections, reducing the need for frequent connection establishment and teardown operations. Connection pools can scale dynamically to accommodate varying workloads and concurrency levels, enabling applications to handle peak demand and scale seamlessly in response to changing traffic patterns. Additionally, connection pools can enhance fault tolerance and resilience by proactively monitoring connection health and handling failures or connectivity issues gracefully. Failover mechanisms and connection retry strategies can ensure continuous availability and reliability of data access operations. By reducing connection overhead and optimizing resource utilization, connection pools can help minimize operational costs associated with cloud storage access, such as network bandwidth usage and connection establishment fees.

A connection pool can comprise hundreds or thousands of individual connections. The lifecycle of each connection can be around 2-3 minutes for cloud-based object storage services. Note that while connection timeout can be configured, an object storage service has their own threshold and will force disconnecting a connection (using, perhaps, a time-to-live setting) to prevent a resource from being occupied for too long a time. For example, a 4 Megabyte (Mb) data transfer may require 60-200 milliseconds so one connection can support 400 to 2000 data transfers before the connection is force-disconnected. The faster a connection, and the greater the number of data transfers using such a connection, the better data transfer performance of each individual connection and that of the connection pool as a whole.

From an end-user perspective, object storage service can be considered to be a front-end server and a back-end server. Within the connection pool, the far-end connection is terminated at an object storage service's front-end server. The effective data transfer rate over each connection may be impacted by several factors, including network congestion, the workload on a particular front-end server, or the workload on a particular back-end server. Any of these issues may lead to less effective data transfers on individual connections, that eventually impact the overall performance of the connection pool.

Distributed object storage, or distributed data object storage, as the name suggests, is object storage implemented in a distributed fashion. This implementation allows for both the features of object storage and the benefits of distributed storage. In many distributed object storage software stacks, the cloud layer can be compared to a static expressway for accessing object storage. In the event of slow individual connections resulting in slow processing by the cloud storage service provider, the connection pool cannot dynamically adjust to maximize performance. In such a scenario, low performance connections can continue to process consecutive data transfers until the end of its lifecycle. Additionally, a new connection may be established at a slow front-end server struggling to process existing connections. From a remediation perspective, current cloud histogram and metrics data can only support engineer triage after-the-fact of a service degradation.

A need exists to intelligently manage the connections in a connection pool so that data transfers can be performed using faster individual connections. This management can include collecting metrics for each REST API/data transfer upon the completion of the transfer, dynamically establishing a low performance threshold for using existing connections, and identifying inefficient connections and disconnecting them as soon as possible. In some cases, disconnection can be achieved before the object storage service terminates the connection using its own time-to-live threshold. Furthermore, an internet protocol (IP) address cache of front-end storage servers can be maintained, in which the transfer metrics are stored, and assigning new connections to the fastest front-end servers. In some embodiments, a connection pool can optimize for network throughput between multiple connections using the data transfer metrics. In some embodiments, a round-robin method can be employed to load-balance the connections across a changing set of front-end servers. In some embodiments, a weighted round-robin method can be used to load-balance the connections. Whereas round-robin cycles over the connections and assigns connections one service opportunity per cycle, weighted round-robin offers to each connection a fixed number of opportunities, as specified by a respective weight value for the connection.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone, e.g., a smartphone. Alternatively, any of clients 101-102 may be a primary storage system, e.g., local data center, providing storage to other local clients, which may periodically back up the content stored therein to a backup storage system, e.g., a disaster recovery site or system, such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one or both clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service-related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored seg-
ment. As a result, segments of data files are stored in a
deduplicated manner, either within each of storage units
108-109 or across at least some of storage units 108-109.
The metadata, such as metadata 110-111, may be stored in at
least some of storage units 108-109, such that files can be
accessed independent of another storage unit. Metadata of
each storage unit includes enough information to provide
access to the files it contains.

In one embodiment, referring back to FIG. 1, any of
clients 101-102 may further include optional deduplication
logic (e.g., deduplication logic 151-152) having at least a
portion of functionalities of deduplication logic 107. Dedu-
plication logic 151-152 are configured to perform local
deduplication operations, respectively. For example, prior to
transmit data to storage system 104, each of the deduplica-
tion logic 151-152 may deduplicate the data into dedupli-
cated segments and determine whether a particular dedupli-
cated segment has already been stored in storage system
104. A deduplicated segment is transmitted to storage sys-
tem 104 only if the deduplicated segment has not been stored
in storage system 104.

For example, in some embodiments, when client 101 is
about to transmit a data stream, e.g., a file or a directory of
one or more files, to storage system 104, deduplication logic
151 can be configured to deduplicate the data stream into
deduplicated segments. For each of the deduplicated seg-
ments, client 101 can transmit a fingerprint or representative
of the deduplicated segment to storage system 104 to
determine whether that particular deduplicated segment has
already been stored in storage system 104. A deduplicated
segment that has been stored in storage system 104 may be
previously received from the same client 101 or from
another client such as client 102. In response to a response
from storage system 104 indicating that the segment has not
been stored in storage system 104, that particular segment is
then transmitted over to the storage system 104. As a result,
the network traffic or bandwidth and the processing
resources required can be greatly reduced.

In some embodiments, storage system 104 further
includes a storage manager or storage controller (not shown)
configured to manage storage resources of storage system
104, such as, for example, storage space and processing
resources, e.g., processor, memory, or network resources.
The storage manager or controller may be accessed by an
administrator of management console or server 160
remotely via a management or configuration interface (not
shown). The administrator can provision and manage stor-
age resources based on a set of policies, rules, and/or service
level agreements. The storage resources may be virtualized
into a pool of virtual storage resources, where underlying
physical storage resources represented by the corresponding
virtual storage resources may be implemented locally,
remotely (e.g., hosted by another storage system), or both.
The virtual storage resources can be provisioned, allocated,
and/or defined by an administrator or automatically by the
storage manager based on a set of software-defined policies.
The virtual storage resources may be represented in one or
more virtual machines (e.g., virtual storage systems) man-
aged by one or more virtual machine managers (VMMs).
Each of the virtual machines can be provisioned to provide
a particular type of storage services, e.g., file-based, block-
based, object-based, or HDFS, to a client based on a storage
policy or service level agreement associated with that par-
ticular client as part of software-defined storage services.

Figure 2:
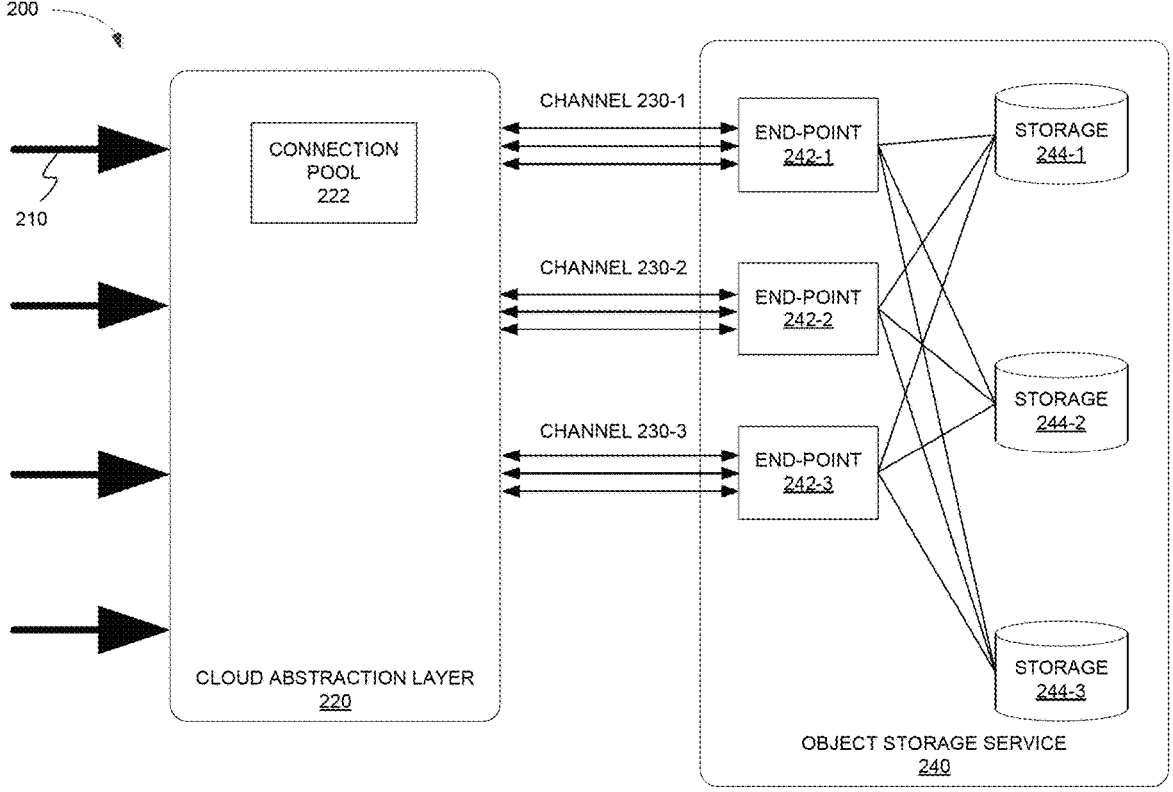
FIG. 2 is a block diagram of an example system of connection pool management according to an embodiment of the present disclosure.

FIG. 2 illustrates a block diagram 200 of an example
system of connection pool management according to an embodiment of the present disclosure. For ease of under-
standing, specific examples mentioned in the following
description are all illustrative and are not intended to limit
the protection scope of the present disclosure.

In FIG. 2, a cloud abstraction layer 220 includes a
connection pool 222. Applications 210 connect to connec-
tion pool 222 to make storage requests of a cloud object
storage system, e.g., object storage service 240. In some
embodiments, object storage service 240 offers various
access interfaces, including RESTful APIs, SDKs, and com-
mand-line interfaces, by which applications can access
cloud storage. In some embodiments, applications 210 rep-
resent processes of a standalone program in execution,
and/or processes/services of an operating system (OS) such
as file input/output (I/O) from the OS to object storage
service 240. Applications 210 can represent applications at
clients 101-102 and/or storage system 104 of FIG. 1. In
some embodiments, object storage service 240 can be pro-
vided by cloud storage server 160 of FIG. 1.

In some embodiments, connection pool 222 may define a
set of channels 230 that in turn connect to a set of end-points
242 provided by the object storage service 240. A connection
pool can manage thousands of connections. Managing these
thousands of connections with a single connection manager
thread can be challenging and inefficient. However, in some
embodiments, these thousands of connections can be
grouped, with each group of connections managed by a
single connection manager. In this context, each group can
be termed a channel, with each channel including a subset of
thousands of connections. Thus, employing multiple threads
to manage the multiple channels can make the connections
management more efficient. In some embodiments, end-
points 242 represent the IP addresses by which a connection
pool can access the object storage service. In some embodi-
ments, in the event of a condition causing a channel 230,
e.g., 230-1 to terminate, the remaining channels may remain
connected to connection pool 222. In some embodiments,
the end-points 242 represent the front-end servers of an
object storage service 240.

In some embodiments, the end-points 242, or front-end
servers, are connected to storage 244. In some embodiments,
storage 244 corresponds to the back-end servers of an object
storage service 240. In some embodiments, the back-end
servers, or storage 244, are not directly accessible by a
connection pool 222.

In some embodiments, an active connection between an
application 210 to an end-point 242 can be disconnected/
released by cloud abstraction layer 220. In some embodi-
ments, cloud abstraction layer 220 calls an API to discon-
nect/release a connection. In some embodiments, a
connection between an application 210, a connection in
connection pool 222, within channel 230, to an end-point
242, is immutable and cannot be changed or terminated
other than by the object storage service 240. As a conse-
quence, should the performance of a particular end-point,
e.g., 242-1, become poor, all the connections through that
particular end-point can be affected, and the applications
using those connections similarly suffer.

Figure 3:
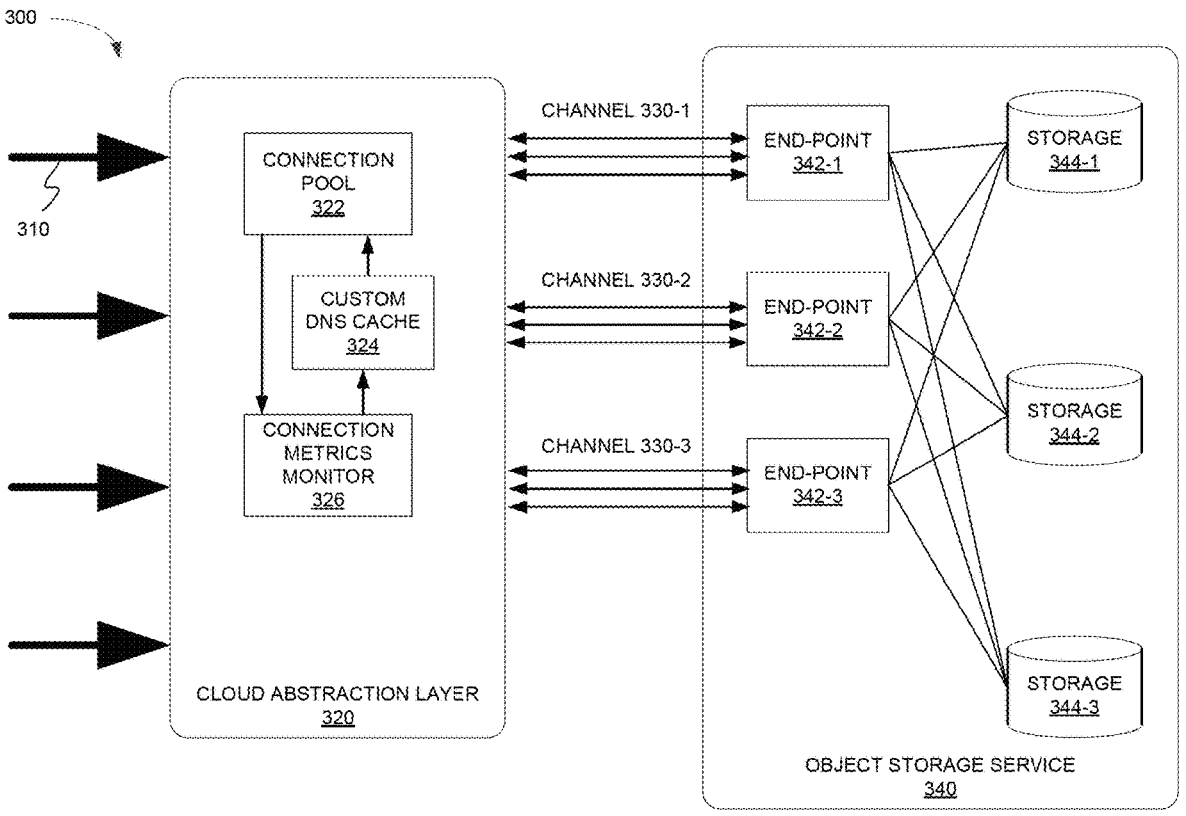
FIG. 3 is a block diagram of an example system for improving connection pool efficiency and improving object storage access performance according to an embodiment of the present disclosure.

FIG. 3 illustrates a block diagram 300 of an example
system for improving connection pool efficiency and
improving object storage access performance according to
an embodiment of the present disclosure. For ease of under-
standing, specific examples mentioned in the following
description are all illustrative and are not intended to limit
the protection scope of the present disclosure.

In FIG. 3, a cloud abstraction layer 320 includes a
connection pool 322. Applications 310 connect to connection pool 322 to make storage requests of a cloud object storage system. In some embodiments, cloud abstraction layer 320 corresponds to cloud abstraction layer 220 of FIG. 2. In some embodiments, connection pool 322 corresponds to connection pool 222 of FIG. 2. Cloud object storage systems offer various access interfaces, including RESTful APIs, SDKs, and command-line interfaces, by which applications can access cloud storage.

In some embodiments, connection pool 322 may define a set of channels 330 that in turn connect to a set of end-points 342 provided by the object storage service 340. In some embodiments, channels 330 correspond to channels 220 of FIG. 2. In some embodiments, end-points 342 corresponds to end-points 242 of FIG. 2. In some embodiments, end-points 342 include the IP addresses by which a connection pool can access the object storage service. In some embodiments, in the event of a condition causing a channel 330, e.g., 330-1 to terminate, the remaining channels of connection pool 322 remain active. In some embodiments, the end-points 342 represent the front-end servers of an object storage service 340. In some embodiments, object storage service 340 corresponds to object storage service 240 of FIG. 2.

In some embodiments, the end-points 342, or front-end servers, are connected to storage 344. In some embodiments, storage 344 corresponds to the back-end servers of an object storage service 340. In some embodiments, storage 344 corresponds to storage 244 of FIG. 2. In some embodiments, the back-end servers, or storage 344, are accessible by a connection pool 322 through end-points 342. In some embodiments, end-points 342 represent front-end servers.

Referring to FIG. 3, cloud abstraction layer 420 can include custom domain name service (DNS) cache 324 and connection metrics monitor 326. Custom DNS cache 324 can maintain a list of IP addresses for end-points 342. Connection metrics monitor 326 can provide performance metrics for active connections. In some embodiments, as new connections are established in the connection pool between connections 310 and the end-points 342, the new connection is reflected in a DNS query. In some embodiments, cloud abstraction layer 320 performs a DNS query and adds an entry from the response of the DNS query request to the custom DNS cache 324 if a connection for that entry does not yet exist in the custom DNS cache 324. In some embodiments, cloud abstraction layer 320 access records from the custom DNS cache 324 to distribute the connections among the available end-points 342. In some embodiments, the distribution of connections is load balanced. In some embodiments, load balancing of the connections is performed by assigning weight values to the end-points 342. In some embodiments, the distribution of connections is performed based on a round-robin algorithm. In some embodiments, the DNS query is periodically requested (using a DNS lookup tool such as nslookup) in order to obtain an updated list of available IP addresses corresponding to active end-points 342. For example, when a new end-point is added to custom DNS cache 324, a weight value corresponding to that end-point 342 is assigned a default weight value. Thereafter, the weight is updated according to performance metrics for connections associated with that end-point. In one embodiment, the default weight value is 50 and a maximum weight value is 100.

In some embodiments, cloud abstraction layer 320 retrieves the monitored performance metrics for a connection upon completion of a data transfer at the connection. The data transfer can be of a fixed size or of a variable size. In some embodiments, these metrics include a throughput of the channel, a latency of the data transfer, and the amount of time required to complete the operation. For example, the weight value can be calculated as a weighted sum, such as: $weight=Ax+By+Cz$, where A, B, and C denote scale factors, x denotes throughput, y denotes latency, and z denotes a time to complete the data transfer. In some embodiments, a weight is calculated for the participating front-end server/end-point, based on the number of connections completed for that end-point 342 and/or the total time required for those connections to complete, and the weight for that end-point in the custom DNS cache 324 is updated. In some embodiments, if a new end-point is added to the custom DNS cache 324, that end-point 342 is assigned a default weight. In some embodiments, for which the maximum weight assigned to an end-point 342 in the custom DNS cache 324 is 100, the default weight is 50. In some embodiments, upon completion of a data transfer over a connection, a new weight is calculated for the end-point 342 and the entry for that end-point 342 in the custom DNS cache 324 is updated.

In some embodiments, if, within a threshold amount of time, a data transfer using a particular connection of end-point 342 is below 1/N of the mean value of all the active data transfers, where N represents the number of active data transfers, the connection of end-point 342 can be removed from the custom DNS cache 324. In some embodiments, if a specified number of data transfers for a particular connection of end-point 342 fails to meet a per-service threshold, the connection of end-point 342 can be removed from the custom DNS cache 324. In some embodiments, metrics can be obtained an a per-service basis. For example, in an embodiment, a GET/PUT of an object transferred in a particular service achieved within 60 ms can be considered good, and within 200 ms, normal. Under such conditions, the system may run at an acceptable level. However, should a GET/PUT for a particular service regularly require 1000-4000 ms, it could impact the performance of the entire system. In such a situation, a per-service threshold can be predefined as 1000 ms and the system can post an alert to alert a user when a particular data transfer fails to meet such as threshold. For example, in some embodiments, if service A is specified to have a per-service threshold X, consecutive data transfers at a connection for service A having performance below threshold X marks the connection to be removed. In some embodiments, by removing the poorest-performing end-point 342 from servicing connections, the overall performance of the connection pool is improved.

In some embodiments, connections and end-points 342 achieving a performance level below a threshold result in alerts being posted to system administrators and logging services. In some embodiments, end-points 342 being removed from the custom DNS cache 324 can result in alerts being posted.

A connection pool can include hundreds or thousands of individual connections. The lifecycle of each connection can be around 2-3 minutes for cloud connections. That is, the connection is dropped when a lifetime of the connection reaches 2-3 minutes. In some embodiment, cloud abstraction layer 320 removes a connection when the connection reaches a predetermined lifetime (e.g., 1.5-2 minutes). Further, a new connection can be identified by identifying new entries in custom DNS cache 324.

Figure 4:
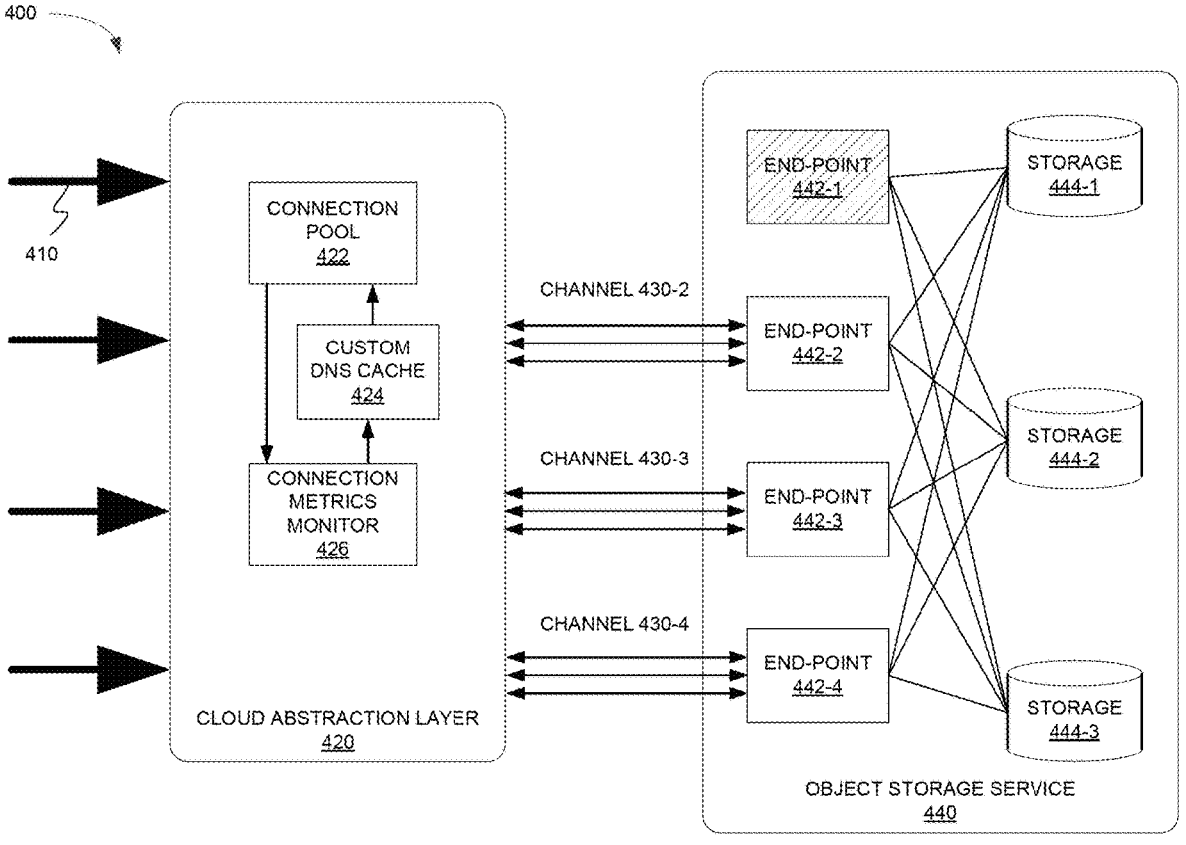
FIG. 4 is a block diagram of an example system for improving connection pool efficiency and improving object storage access performance according to an embodiment of the present disclosure.

FIG. 4 illustrates a block diagram 400 of an example system for improving connection pool efficiency and improving object storage access performance according to an embodiment of the present disclosure. For ease of understanding, specific examples mentioned in the following description are all illustrative and are not intended to limit the protection scope of the present disclosure.

In FIG. 4, a cloud abstraction layer 420 includes a connection pool 422. Applications 410 connect to connection pool 422 to make storage requests of a cloud object storage system. In some embodiments, cloud abstraction layer 420 corresponds to cloud abstraction layer 220 of FIG. 2. In some embodiments, connection pool 422 corresponds to connection pool 222 of FIG. 2. Cloud object storage systems offer various access interfaces, including RESTful APIs, SDKs, and command-line interfaces, by which applications can access cloud storage.

In some embodiments, connection pool 422 may define a set of channels 430 that in turn connect to a set of end-points 442 provided by the object storage service 440. In some embodiments, channels 430 correspond to channels 230 of FIG. 2. In some embodiments, end-points 442 corresponds to end-points 242 of FIG. 2. In some embodiments, end-points 442 represent the IP addresses by which a connection pool can access the object storage service. In some embodiments, in the event of a condition causing a channel to terminate, the remaining channels may remain connected to connection pool 422. In some embodiments, connections are established in connection pool 422 over channels 430 to end-points 442. FIG. 4 shows that while end-point 442-1 maintains its connections to storage 444, its connections to the connection pool have terminated. In some embodiments, end-point 442-1 corresponds to end-point 342-1 of FIG. 3. In some embodiments, the end-points 442 represent the front-end servers of an object storage service 440. In some embodiments, object storage service 440 corresponds to object storage service 240 of FIG. 2. In some embodiments, end-point 442-1 has been removed from custom DNS cache 424.

In some embodiments, the end-points 442, or front-end servers, are connected to storage 444. In some embodiments, storage 444 corresponds to the back-end servers of an object storage service 440. In some embodiments, storage 444 corresponds to storage 244 of FIG. 2. In some embodiments, the back-end servers, or storage 444, are not directly accessible by a connection pool 422.

FIG. 4 also includes custom DNS cache 424 and connection metrics monitor 426. Custom DNS cache 424 maintains a list of IP addresses for end-points 442, e.g., the front-end servers. In some embodiments, as new connections are established between connections 410 in the connection pool and the end-points 442, the end-point is added to the custom DNS cache 424 if that end-point does not yet exist in the custom DNS cache 424. In some embodiments, end-points 442 can be removed from custom DNS cache 424 and be made unavailable to the connection pool. In some embodiments, the custom DNS cache 424 is consulted when establishing new connections between connection pool 422 and the end-points 442 to distribute the connections among the available end-points 442. In some embodiments, the distribution of connections involves a weight associated with the end-point 442. In some embodiments, the distribution of connections is based on a round-robin algorithm. In some embodiments, object storage service 440 is periodically queried in order to obtain an updated list of available IP addresses for end-points 442. In some embodiments, upon completion of a connection 410 in connection pool 422, the weight is calculated for the participating front-end server/end-point 442, based on the number of connections completed for that end-point 442 and the total time required for those connections to complete, and the entry for that end-point 442 in the custom DNS cache 424 is updated. In some embodiments, if a new end-point is added to the custom DNS cache 424, that end-point 442 is assigned a default weight. In some embodiments, for which the maximum weight assigned to an end-point 442 in the custom DNS cache 424 is 100, the default weight is 50.

In FIG. 4, corresponding to some embodiments, a new end-point 442-4 is made available by the object storage service 440 to the cloud abstraction layer 420. In some embodiments, this new end-point 442-4 is connected to the various back-end servers of the object storage service, as indicated by storage 444-1, 444-2, and 444-3. In some embodiments, this new end-point 442-4 becomes known to cloud abstraction layer 420, is added to custom DNS cache 424, and a channel, e.g., channel 430-4, is established between connection pool 422 and end-point 442-4. In some embodiments, connections involving channel 430-4 and end-point 442-4 are established in connection pool 422.

Upon completion of a data transfer operation, connection metrics monitor 426 retrieves that connection's metrics. In some embodiments, these metrics include the IP address of the participating end-point and the amount of time required to complete the operation. In some embodiments, a weight is calculated for the participating front-end server/end-point, based on the number of connections completed for that end-point 442 and the total time required for those connections to complete, and the weight for that end-point in the custom DNS cache 424 is updated. In some embodiments, if a new end-point is added to the custom DNS cache 424, that end-point 442 is assigned a default weight. In some embodiments, for which the maximum weight assigned to an end-point 442 in the custom DNS cache 424 is 100, the default weight is 50. In some embodiments, upon completion of a data transfer over a connection, a new weight is calculated for the end-point 442 and the entry for that end-point 442 in the custom DNS cache 424 is updated.

In some embodiments, if, within a threshold amount of time, a data transfer using a particular end-point 442 is below 1/N of the mean value of all the active data transfers, where N represents the number of active data transfers, the end-point 442 can be removed from the custom DNS cache 424. In some embodiments, if one or more data transfers involving a particular end-point 442 fail to meet a per-service threshold, the end-point 442 can be removed from the custom DNS cache 424. In some embodiments, by removing the poorest-performing end-point 442 from servicing connections, the overall performance of the connection pool is improved.

In some embodiments, upon a connection timing out due to the connection exceeding a configured connection timeout for the connection pool or an object storage service's connection timeout, creation of a new connection can be achieved by consulting the custom DNS cache 424 and using a combination of a round-robin algorithm among the highest-weighted front-end servers/end-points 442.

Figure 5:
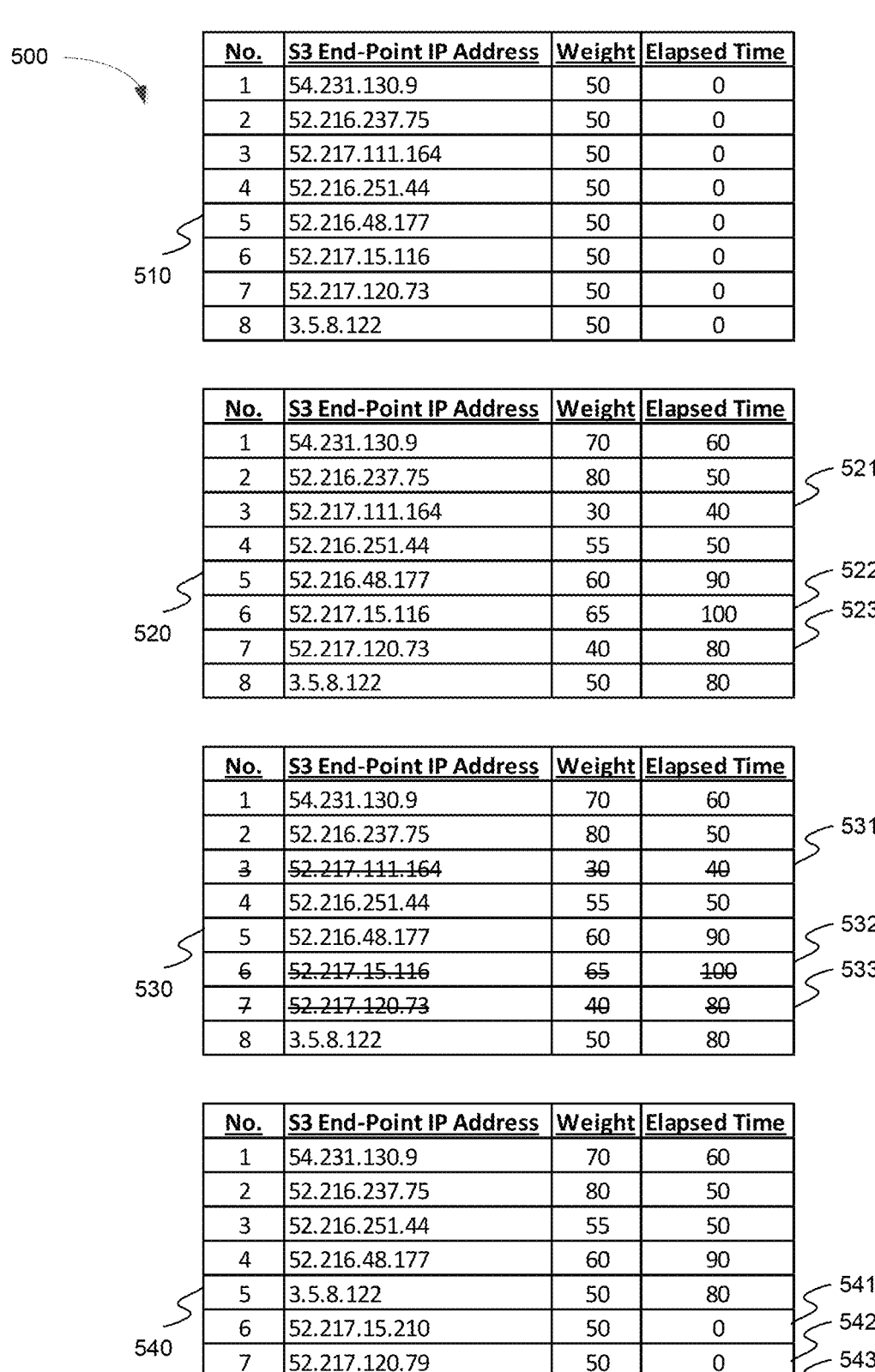
FIG. 5 illustrates a time-lapsed custom domain name service (DNS) cache, according to an embodiment of the present disclosure.

FIG. 5 illustrates a time-lapsed custom DNS cache 500, according to an embodiment of the present disclosure. In some embodiments, custom DNS cache 500 corresponds to custom DNS cache 324 of FIG. 3 and custom DNS cache 424 of FIG. 4. In some embodiments, custom DNS cache 500 is accessed and updated by processing logic that may comprise hardware, e.g., circuitry or dedicated logic, software (such as is run on a general-purpose computer system or a dedicated machine), firmware, or a combination. In some embodiments, custom DNS cache 500 is updated by processing logic to reflect a set of preferred cloud storage end-points. For ease of understanding, specific examples mentioned in the following description are all illustrative and are not intended to limit the protection scope of the present disclosure.

Table 510 can illustrate a snapshot of custom DNS cache 500, initialized at a first time $T_1$, according to an embodiment of the present disclosure. Upon initialization of the custom DNS cache 510, the cache contains a list of end-points, their IP addresses, an initial weight, and an elapsed time value. In some embodiments, the initial weight is set to 50. In some embodiments, the weight is a value between zero and 100. In some embodiments, a higher weight indicates faster throughput to the end-point, etc.

Table 520 can illustrate a snapshot of custom DNS cache 500, at a second time $T_2$, according to an embodiment of the present disclosure. At time $T_2$, the weight value of the end-points and the elapsed time of the connections using that end-point have been updated. In an embodiment, the entry 521 for end-point No. 3 now has a weight of 30, and an elapsed time of 40, the entry 522 for end-point No. 6 now has a weight of 65 and an elapsed time of 100, and the entry 523 for end-point No. 7 now has a weight of 40 and an elapsed time of 80. In an embodiment, an end-point having a weight below a threshold of 50 is a candidate for removal from the custom DNS cache 500. In an embodiment, an end-point having an elapsed time exceeding 100 is a candidate to be precluded from receiving new connections. In an embodiment, an end-point having an elapsed time exceeding 100 is a candidate for removal from the custom DNS cache 500. In some embodiments, precluding new data transfers over existing connections can avoid having to restart a data transfer as a result of that connection being terminated by the object storage service because the connection exceeded its own time-to-live threshold.

Table 530 can illustrate a snapshot of custom DNS cache 500, at a third time $T_3$, according to an embodiment of the present disclosure. At time $T_3$, end-points 3, 6, and 7, corresponding to end-points 3, 6, and 7, have been marked for deletion from the cache. In some embodiments, existing connections in the connection pool, using those end-points, will be instructed to terminate and acquire new connections using the remaining end-points in the custom DNS cache. In some embodiments, in-flight data transfers using those existing connections will be allowed to complete before termination. In some embodiments, existing connections whose end-point exceeds an elapsed time threshold but also exceeds a weight threshold will be allowed to continue, but no new connections will be assigned to that end-point. In some embodiments, such a connection will be allowed to continue until reaching the time threshold of the object storage service, which will force disconnection of the connection.

Table 540 can illustrate a snapshot of custom DNS cache 500, at a fourth time $T_4$, according to an embodiment of the present disclosure. At time $T_4$, new end-points 541, 542, and 543, comprising IP addresses 52.217.15.210, 52.217.120.79, and 3.10.9.12 have been added to custom DNS cache 500. In some embodiments, an initial weight of 50 is assigned to these new end-points. In some embodiments, an initial elapsed time value of zero is assigned to these new end-points.

FIG. 6 is a flow diagram illustrating a process 600 for improving connection pool efficiency and improving object storage access performance according to an embodiment of the present disclosure. Process 600 may be performed by processing logic that includes hardware, e.g., circuitry or dedicated logic, software, e.g., embodied in a non-transitory computer readable medium, or a combination thereof. For example, process 600 may be performed by an application on clients 101 and 102, storage service engine/logic 106 storage system 104, or cloud storage server 160 of FIG. 1.

At step 610, processing logic determines a set of connections in a connection pool of a storage system, the set of connections corresponding to open connections established by the storage system, e.g., storage system 104 of FIG. 1, to a set of end-points, e.g., end-points 242 of FIG. 2, of an object storage service of a cloud provider, e.g., cloud storage server 160 of FIG. 1, wherein an application of the storage system accesses the object storage service through one or more connections from the set of connections. In some embodiments, the open connections are established between a client, e.g., clients 101-102 of FIG. 1, to the set of end-points. The connection pools can be http connection pools implemented by libcurl or another library/API. In some embodiments, the connection pool corresponds to connection pool 322 of FIG. 3. A custom DNS cache maintains a list of IP addresses for end-points, e.g., the front-end servers. In some embodiments, the custom DNS cache corresponds to custom DNS cache 324 of FIG. 3. In some embodiments, as new connections are established between connections in the connection pool and the end-points, the end-point is added to the custom DNS cache if that end-point does not yet exist in the custom DNS cache.

At step 620, processing logic monitors data transfers over the set of connections. Upon completion of a data transfer operation, a connection metrics monitor retrieves that connection's metrics. In some embodiments, the connection metrics monitor corresponds to connection metrics monitor 326 of FIG. 3.

At step 630, processing logic collects performance metrics associated with the data transfers. In some embodiments, these metrics correspond to the IP address of the participating end-point and can include a throughput, e.g., the amount of data passing through the channel, latency, e.g., a delay between a request from the client/storage system and a response from the end-point, and the amount of time required to complete the operation. In some embodiments, a weight is calculated for the participating front-end server/end-point, based on the number of connections completed for that end-point and the total time required for those connections to complete, and the weight for that end-point in the custom DNS cache is updated.

At step 640, processing logic identifies a first connection of the set of connections, the first connection having performance metrics outside a threshold. In some embodiments, if, within a threshold amount of time, a data transfer using a particular end-point is below $1/N$ of the mean value of all the active data transfers, where N represents the number of active data transfers, that end-point can be removed from the custom DNS cache. In some embodiments, if one or more data transfers involving a particular end-point fail to meet a per-service threshold, the end-point can be removed from the custom DNS cache.

At step 650, processing logic identifies a second connection being added to the set of connections in the connection pool. In some embodiments, as new connections are established between connections in the connection pool and the end-points, the end-point is added to the custom DNS cache if that end-point does not yet exist in the custom DNS cache. In some embodiments, the custom DNS cache is consulted when establishing new connections between the connection pool and the end-points to distribute the connections among the available end-points. In some embodiments, the distribution of connections involves a weight associated with the end-point. In some embodiments, the distribution of connections is based on a round-robin algorithm.

At step 660, processing logic marks the first connection for removal from the connection pool. In some embodiments, if, within a threshold amount of time, a data transfer using a particular end-point is below 1/N of the mean value of all the active data transfers, where N represents the number of active data transfers, the end-point can be removed from the custom DNS cache. In some embodiments, if one or more data transfers involving a particular end-point fail to meet a per-service threshold, the end-point can be removed from the custom DNS cache. In some embodiments, by removing the poorest-performing end-points from servicing connections, the overall performance of the connection pool is improved.

FIG. 7 is a block diagram illustrating an example of a data processing system 700 that may be used with one embodiment of the invention. For example, system 700 may represent any of data processing systems described above performing any of the processes or methods described above. System 700 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 700 is intended to show a high-level view of many components of the computer system. However, it is to be understood that additional components may be present in certain implementations and furthermore, different arrangement of the components shown may occur in other implementations. System 700 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 700 includes processor 701, memory 703, and devices 705-708 via a bus or an interconnect 710. Processor 701 may represent a single processor or multiple processors with a single processor core or multiple processor cores included therein. Processor 701 may represent one or more general-purpose processors such as a microprocessor, a central processing unit (CPU), or the like. More particularly, processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 701, which may be a low power multi-core processor socket such as an ultra-low voltage processor, may act as a main processing unit and central hub for communication with the various components of the system. Such processor can be implemented as a system on chip (SoC). Processor 701 is configured to execute instructions for performing the operations and steps discussed herein. System 700 may further include a graphics interface that communicates with optional graphics subsystem 704, which may include a display controller, a graphics processor, and/or a display device.

Processor 701 may communicate with memory 703, which in one embodiment can be implemented via multiple memory devices to provide for a given amount of system memory. Memory 703 may include one or more volatile storage (or memory) devices such as random-access memory (RAM), dynamic RAM (DRAM), synchronous DRAM (SDRAM), static RAM (SRAM), or other types of storage devices. Memory 703 may store information including sequences of instructions that are executed by processor 701, or another device. For example, executable code and/or data of a variety of operating systems, device drivers, firmware, e.g., basic input output system or BIOS, and/or applications can be loaded in memory 703 and executed by processor 701. An operating system can be any kind of operating systems, such as, for example, Windows®operating system from Microsoft®, Mac OS®/iOS® from Apple, Android® from Google®, Linux®, UNIX®, or other real-time or embedded operating systems such as VxWorks.

System 700 may further include IO devices such as devices 705-708, including network interface device(s) 705, optional input device(s) 706, and other optional IO device(s) 707. Network interface device 705 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver, e.g., a global positioning system (GPS) transceiver, or other radio frequency (RF) transceivers, or a combination thereof. The NIC may be an Ethernet card.

Input device(s) 706 may include a mouse, a touch pad, a touch sensitive screen (which may be integrated with display device 704), a pointer device such as a stylus, and/or a keyboard, e.g., a physical keyboard or a virtual keyboard displayed as part of a touch sensitive screen. For example, input device 706 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 707 may include an audio device. An audio device may include a speaker and/or a microphone to facilitate voice-enabled functions, such as voice recognition, voice replication, digital recording, and/or telephony functions. Other IO devices 707 may further include universal serial bus (USB) port(s), parallel port(s), serial port(s), a printer, a network interface, a bus bridge, e.g., a PCI-PCI bridge, sensor(s), e.g., a motion sensor such as an accelerometer, gyroscope, a magnetometer, a light sensor, compass, or a proximity sensor, or a combination thereof. Devices 707 may further include an imaging processing subsystem, e.g., a camera, which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 710 via a sensor hub (not shown), while other devices such as a keyboard or thermal sensor may be controlled by an embedded controller (not shown), dependent upon the specific configuration or design of system 700.

To provide for persistent storage of information such as data, applications, one or more operating systems and so forth, a mass storage (not shown) may also couple to processor 701. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 701, e.g., via a serial peripheral interface (SPI). This flash device may provide for non-volatile storage of system software, including a basic input/output software (BIOS) as well as other firmware of the system.

Storage device 708 may include computer-accessible storage medium 709 (also known as a machine-readable storage medium or a computer-readable medium) on which is stored one or more sets of instructions or software, e.g., processing module, unit, and/or logic 728, embodying any one or more of the methodologies or functions described herein. Processing module/unit/logic 728 may represent any of the components described above, such as, for example, a compression module 122, a deduplication engine, as described above. Processing module/unit/logic 728 may also reside, completely or at least partially, within memory 703 and/or within processor 701 during execution thereof by data processing system 700, memory 703 and processor 701 also constituting machine-accessible storage media. Processing module/unit/logic 728 may further be transmitted or received over a network via network interface device 705.

Computer-readable storage medium 709 may also be used to store some software functionalities described above persistently. While computer-readable storage medium 709 is shown in an exemplary embodiment to be a single medium, the term "computer-readable storage medium" should be taken to include a single medium or multiple media, e.g., a centralized or distributed database, and/or associated caches and servers, that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 728, components and other features described herein can be implemented as discrete hardware components or integrated in the functionality of hardware components such as ASICS, FPGAs, DSPs or similar devices. In addition, processing module/unit/logic 728 can be implemented as firmware or functional circuitry within hardware devices. Further, processing module/unit/logic 728 can be implemented in any combination hardware devices and software components.

Note that while system 700 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems that have a different number of may also be used with embodiments of the invention.

Some portions of the preceding detailed descriptions have been presented in terms of algorithms and symbolic representations of operations on data bits within a computer memory. These algorithmic descriptions and representations are ways used by those skilled in the data processing arts to convey, to others skilled in the art, the substance of their work. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine, e.g., a computer. For example, a machine-readable, e.g., computer-readable, medium includes a machine, e.g., a computer, readable storage medium, e.g., read-only memory ("ROM"), random-access memory ("RAM"), magnetic disk storage media, optical storage media, or flash memory devices.

The processes or methods depicted in the preceding figures may be performed by processing logic that comprises hardware, e.g. circuitry or dedicated logic, software, e.g., embodied on a non-transitory computer readable medium, or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A method, comprising:

determining a set of connections in a connection pool of a storage system, the set of connections corresponding to open connections established by the storage system to a set of end-points of an object storage service of a cloud provider, wherein an application of the storage system accesses the object storage service through one or more connections from the set of connections;

monitoring data transfers over the set of connections including transmitting and receiving of data from the storage system to the object storage service;

collecting performance metrics associated with the data transfers;

identifying a first connection of the set of connections, the first connection having performance metrics below a predetermined threshold;

identifying a second connection being added to the set of connections in the connection pool; and marking the first connection for removal from the connection pool.

2. The method of claim 1, wherein the metrics comprise, for each end-point of the set of end-points, at least one of a weight or an elapsed time, the weight based on a data transfer rate with each end-point and a quantity of data transfers involving each end-point.

3. The method of claim 1, wherein identifying the second connection being added comprises:

assigning the second connection to an end-point of the subset of the set of end-points based on a round-robin selection to load balance the connections.

4. The method of claim 1, wherein the metrics are maintained in a custom domain name service (DNS) cache, wherein the cache specifies end-point internet protocol (IP) addresses, weights, and elapsed times for a plurality of connections.

5. The method of claim 1, further comprising:

maintaining the custom DNS cache;

performing a DNS query against the object storage service; and updating the set of connections and associated end-point internet protocol (IP) addresses according to the DNS query.

6. The method of claim 1, wherein removing the first connection comprises draining the first connection.

7. The method of claim 1, wherein removing the first connection is based on a duration of the first connection.

8. The method of claim 1, wherein adding the second connection comprises adding a new end-point.

9. The method of claim 8, wherein adding the new end-point comprises adding a default weight to the metrics for the new end-point.

10. A system, comprising:

a memory; and a processing device operatively coupled to the memory, the processing device to:

determine a set of connections in a connection pool of a storage system, the set of connections corresponding to open connections established by the storage system to a set of end-points of an object storage service of a cloud provider, wherein an application of the storage system accesses the object storage service through one or more connections from the set of connections;

monitor data transfers over the set of connections including transmitting and receiving of data from the storage system to the object storage service;

collect performance metrics associated with the data transfers;

identify a first connection of the set of connections, the first connection having performance metrics below a predetermined threshold;

identify a second connection being added to the set of connections in the connection pool; and mark the first connection for removal from the connection pool.

11. The system of claim 10, wherein the metrics comprise, for each end-point of the set of end-points, at least one of a weight or an elapsed time, the weight based on a data transfer rate with each end-point and a quantity of data transfers involving each end-point.

12. The system of claim 10, wherein to identify the second connection being added is further to:

assign the second connection to an end-point of the subset of the set of end-points based on a round-robin selection to load balance the connections.

13. The system of claim 10, wherein the metrics are maintained in a custom domain name service (DNS) cache, wherein the cache specifies end-point internet protocol (IP) addresses, weights, and elapsed times for a plurality of connections.

14. The system of claim 10, further to:

maintain the custom DNS cache;

perform a DNS query against the object storage service; and update the set of connections and associated end-point internet protocol (IP) addresses according to the DNS query.

15. The system of claim 10, wherein to remove the first connection is further to drain the first connection.

16. The system of claim 10, wherein to remove the first connection is based on a duration of the first connection.

17. The system of claim 10, wherein to add the second connection is further to add a new end-point.

18. The system of claim 17, wherein adding the new end-point comprises adding a default weight to the metrics for the new end-point.

19. A non-transitory computer-readable medium having instructions stored thereon which, when executed by a processing device, cause the processing device to:

determine a set of connections in a connection pool of a storage system, the set of connections corresponding to open connections established by the storage system to a set of end-points of an object storage service of a cloud provider, wherein an application of the storage system accesses the object storage service through one or more connections from the set of connections;

monitor data transfers over the set of connections including transmitting and receiving of data from the storage system to the object storage service;

collect performance metrics associated with the data transfers;

identify a first connection of the set of connections, the first connection having performance metrics below a predetermined threshold;

identify a second connection being added to the set of connections in the connection pool; and mark the first connection for removal from the connection pool.

20. The non-transitory computer-readable medium of claim 19, wherein the metrics comprise, for each end-point of the set of end-points, at least one of a weight or an elapsed time, the weight based on a data transfer rate with each end-point and a quantity of data transfers involving each end-point.

* * * * *